United States Patent
Tupman et al.

(10) Patent No.: US 7,574,177 B2
(45) Date of Patent: Aug. 11, 2009

(54) REMOTE CONTROLLER AND FM RECEPTION ARRANGEMENT

(75) Inventors: Dave Tupman, San Francisco, CA (US); Jesse Dorogusker, Menlo Park, CA (US); Tony Fadell, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 668 days.

(21) Appl. No.: 11/326,169

(22) Filed: Jan. 4, 2006

(65) Prior Publication Data

US 2007/0206827 A1    Sep. 6, 2007

(51) Int. Cl.
*H04B 1/38* (2006.01)

(52) U.S. Cl. .................. 455/90.3; 455/566.1; 455/566; 455/571; 455/573

(58) Field of Classification Search ............... 455/90.3, 455/556.1, 566, 571, 572, 573, 574, 93, 73
See application file for complete search history.

(56) References Cited

U.S. PATENT DOCUMENTS

| | | | | |
|---|---|---|---|---|
| 6,038,457 | A * | 3/2000 | Barkat | 455/556.1 |
| 2002/0090982 | A1 * | 7/2002 | Hollstrom et al. | 455/569 |
| 2004/0162029 | A1 * | 8/2004 | Grady | 455/42 |
| 2006/0035527 | A1 * | 2/2006 | Numano | 439/668 |
| 2006/0109987 | A1 * | 5/2006 | Baek | 381/86 |
| 2007/0015457 | A1 * | 1/2007 | Krampf et al. | 455/3.06 |

* cited by examiner

*Primary Examiner*—Tuan A Pham
(74) *Attorney, Agent, or Firm*—Beyer Law Group LLP

(57) ABSTRACT

A modular communication system that includes a battery operated portable multimedia player is used to remotely control a accessory unit arranged to provide an output audio stream to an audio output device. At a user's discretion, the multimedia player can also be used to provide the original audio source material that is, in turn, processed by the accessory unit for output to the audio output device or an accessory unit can be used to provide the audio source material from, for example, a radio tuner incorporated therein.

30 Claims, 7 Drawing Sheets

REMOTE CONTROLLER AND FM RECEPTION ARRANGEMENT

FIELD OF INVENTION

This invention relates generally to remote communication devices such as multimedia players, cell phones, radios (either mobile or stationary) and personal digital assistants. More specifically, the invention describes a user configurable modular communications system.

DESCRIPTION OF RELATED ART

Recent developments in consumer electronics have included the introduction of remote client devices such as portable multimedia players (such as MP3 players, minidisk players), cell phones, personal digital assistants (PDAs) and the like.

For example, in the case of an MP3 player (or, for that matter, any other digital media playback device), a number of digitized audio files are stored in a storage medium included in or coupled to the player in a fashion deemed most suitable to that user. In the case of MP3 files, for example, a user of the MP3 player must be able to conveniently interact with the player in order to peruse and select a particular file (or files) based upon such characteristics as music genre, author, album, or whatever grouping of MP3 files is present in the MP3 player. In addition to merely selecting a particular file, it would be of great convenience to the user to be able to listen to the selected MP3 file and read any associated information on a receiver unit, such as a car radio, that is separate and distinct from the player itself.

Therefore, what is desired is a convenient way for a user to concurrently listen to a selected digital multimedia file and view any associated information pertaining to the multimedia file.

SUMMARY OF THE INVENTION

A modular communication system is described that includes a bi-directional cable that optionally connects a multimedia player unit arranged to process a selected one of a plurality of stored digital multimedia files and an accessory unit. When the media player is active, the media player provides power to the accessory unit by way of the bi-directional cable that is used by the accessory unit for receiving and processing an over the air (OTA) RF broadcast signal. When the processed RF signal includes an audio signal, then the audio signal is further processed to form an output audio signal.

In one embodiment, the accessory unit is compatible with Radio Data System (RDS) embodied in what is commonly referred to as an RDS enabled "smart" radio. The multimedia file is a digital media file in any of a number of digital media formats whilst the multimedia player takes the form of a pocket sized, portable digital media file player, such as an iPod™ manufactured by Apple Computer Corporation of Cupertino, Calif.

In another embodiment, method of operation of a media player having a media player user interface arranged to store media files optionally connected by way of a bi-directional cable to an accessory unit having an RF receiver and an amplifier unit is described. The method includes the following operations, determining if the media player unit is connected to the accessory player, when the media player unit is active, providing power by the media unit by way of the bi-directional cable to the accessory unit for receiving and processing an over the air (OTA) RF broadcast signal wherein when the processed RF broadcast signal includes an encoded data signal, then the encoded data signal is passed back to the media player unit by way of the bi-directional cable for display of any displayable data encoded therein to form an output signal. When the processed RF signal includes an audio signal, further processing the audio signal to form an output audio signal.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Figure 1A:
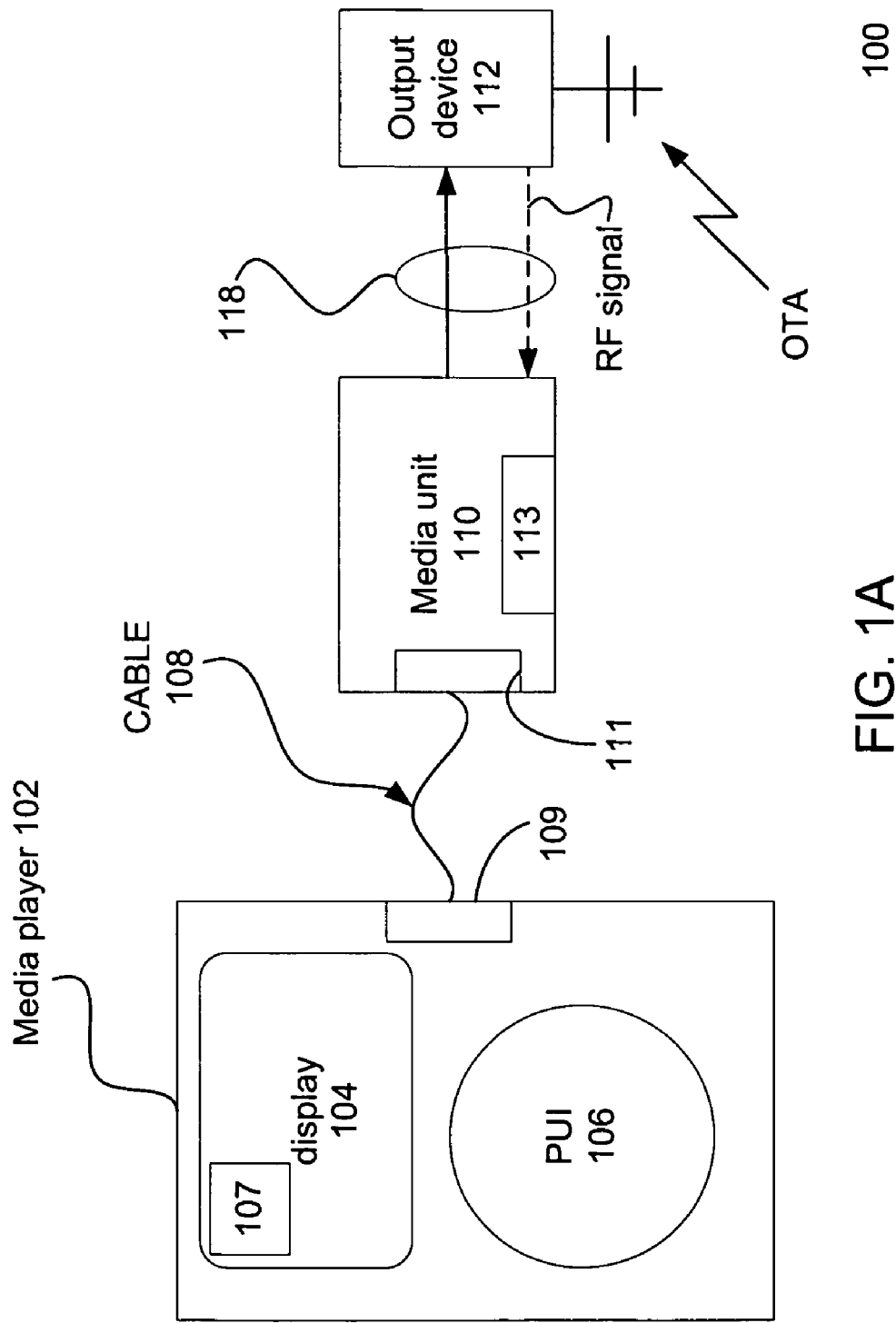
FIGS. 1A-1B each show an of embodiment of a communication system in accordance with the invention.

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

According to one embodiment, a battery operated portable multimedia player is used to remotely control a accessory unit arranged to provide an output audio stream to an audio output device such as a headphone, earphone, etc. At a user's discretion, the multimedia player can also be used to provide the original audio source material that is, in turn, processed by the accessory unit for output to the audio output device or an accessory unit can be used to provide the audio source material from, for example, a radio tuner incorporated therein. It should be noted that in either case, either the multimedia player or the accessory unit can be used to provide control signals (i.e., volume, radio station selection, etc.). In addition, when the radio tuner is configured as a smart radio (RDS/RBDS), then data can be passed from the accessory unit to the multimedia player for display on a display screen.

In the described embodiment, the accessory unit includes a controller unit, an audio amplifier unit, and an RF tuner unit. In the case where the portable multimedia player acts as the original audio source, the RF tuner is powered down in order to preserve battery power, otherwise, the RF tuner is powered up and configured to process any number of available radio broadcast formats. In a particularly useful embodiment, the audio output device includes an antenna used to receive radio signals that are, in turn, processed by the RF tuner unit.

The RF tuner included in the accessory unit is compatible with a number of both digital and analog radio broadcast formats (FM, AM, RDS/RBDS). It should be noted that the Radio (Broadcast) Data System (RDS)/RBDS) is a broadcast format that sends extra information along with VHF/FM radio services suitable receiving equipment without affecting the normal audio program. The basic concept behind RDS is that each FM radio station is given a set bandwidth can be used for it's broadcasting. However, most stations do not use all of their bandwidth, and the spare bandwidth is usually wasted. Therefore, RDS uses this wasted bandwidth for transmitting a low bit rate FM radio based data signal by being modulated into the radio station signal and transmitted along side it. This arrangement is very cost effective since the existing transmitting towers can be used with very little modification. In this way, when configured to receive and process RDS/RBDS radio broadcast signals, data can be transferred from the RF tuner to the multimedia player for, if desired, display on a display screen.

The invention described herein pertains to a method, apparatus, and system that affords a user of a personal portable communication device, such as a multimedia player (along the lines of an IPOD™ multimedia player manufactured by Apple Computer Corporation of Cupertino, Calif.) the ability to either remotely control (either wired or wirelessly) a compatible accessory unit (such as, for example, a Radio Data System (RDS) enabled radio) or to act as a source of audio source material (such as digital audio files stored therein). As a control unit, the multimedia player provides a number of control signals to the accessory unit that include, for example, a volume control signal, an RF tuner control signal (for selecting a particular radio broadcast format, station, etc.) and a mode control signal (for powering up or down the RF tuner unit, for example). In those situations when the RF tuner is powered up and configured to receive RDS/RBDS radio broadcasts, the accessory unit (when configured as an RDS enabled radio is often referred to as a "smart radio") receives media data (i.e., songs, music, etc.) and its related information (e.g., song title, title artist, etc) using Radio Data Service (RDS) based data bitstream. This data is communicated back to the multimedia player for display to the user. In this way, the user can (in addition to selecting a particular song or music selection) be provided with information (such as artist) directly related to a particular musical selection. For example, a user can use the available music data to select only certain artists, or only music having certain titles, etc. thereby greatly enhancing the user's listening experience. When the multimedia player is configured to perform as a provider of source material, the RF tuner is powered down in order to preserve battery power and a user can select any of a number of digital multimedia files (such as music, song, or even images or video), which is then processed by the multimedia player for output by the accessory unit to the external audio device.

It should also be noted, that in a particularly useful embodiment, the accessory unit includes a user interface that provides user input signals to not only the accessory unit but also to the media player. In this way, the accessory unit performs a limited remote control function for the multimedia player by, for example, increasing or decreasing the sound volume produced at a speaker unit connected to the multimedia player.

The invention will now be described in terms a portable multimedia player capable of storing a number of multimedia digital data files. For example, in the case of the multimedia player being a pocket sized portable player (such as the IPOD™ player manufactured by the Apple Computer Inc. of Cupertino, Calif.), the multimedia data files can include MP3 files as well as any other appropriately formatted data files.

Accordingly, FIG. 1A shows a system 100 in accordance with an embodiment of the invention. As shown, the system 100 includes a portable media player 102 having a display screen 104 and a user interface that includes a user interface 105 that takes the form of a physical user interface (PUI) 106 (having keys, scroll wheels, etc.) and/or a graphical user interface (GUI) 107 (having selectable icons, menus, etc.) connected by way of a bi-directional cable 108 to a accessory unit 110 by way of ports 109 and 111. The accessory unit 110 is, in turn, connected to (either wirelessly or in a wired manner) to an output device 112 (such as a headphone, loudspeaker, etc.) by way of a connection 118. In the described embodiment, the accessory unit 110 includes a user interface 113 (that can be a PUI and/or a GUI) that in any case provides user input signals that are acted upon by the accessory unit 110, or in some cases, by the media player 102 thereby augmenting (or in some cases superceding) some or all of the user interface 106. It should be noted that due to the bi-directional nature of the cable 108, the user interface 105 can augment or supercede some or all of the functions of the user interface 113.

In a particularly useful embodiment, the output device 112 includes an antenna 119 for receiving over the air (OTA) broadcast signals that are sent to the accessory unit 10 for processing by way of the connection 118 to an RF tuner incorporated in or coupled to the accessory unit 110. In another embodiment (not shown at this point for sake of simplicity), the output device 112 is eliminated in favor of either a built in speaker or an external speaker connected to an output port 122 included in the media player 102. By taking advantage of the output port 122, the accessory unit 110 is simplified.

Figure 1B:
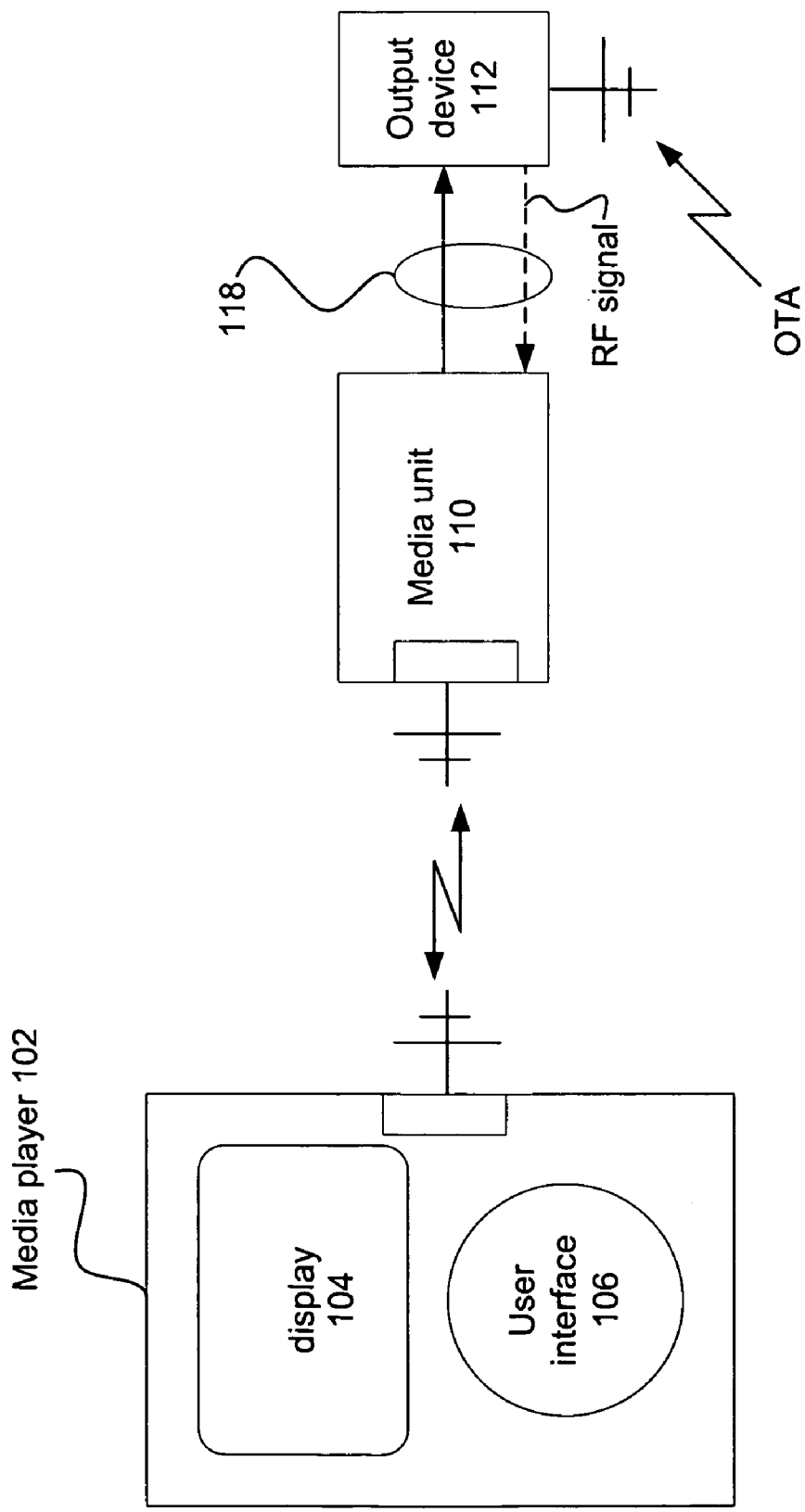

In some cases as shown in FIG. 1B, the media player 102 is in wireless communication with the accessory unit 110 thereby eliminating the necessity of the cable 108. In this arrangement, the media player 102 is part of wireless network. The wireless network can take the form of, for example, a "WiFi" network according to the IEEE 802.11b or 802.11g standards. Other wireless network standards could also be used, either in alternative to the identified standards or in addition to the identified standards.

Figure 2:
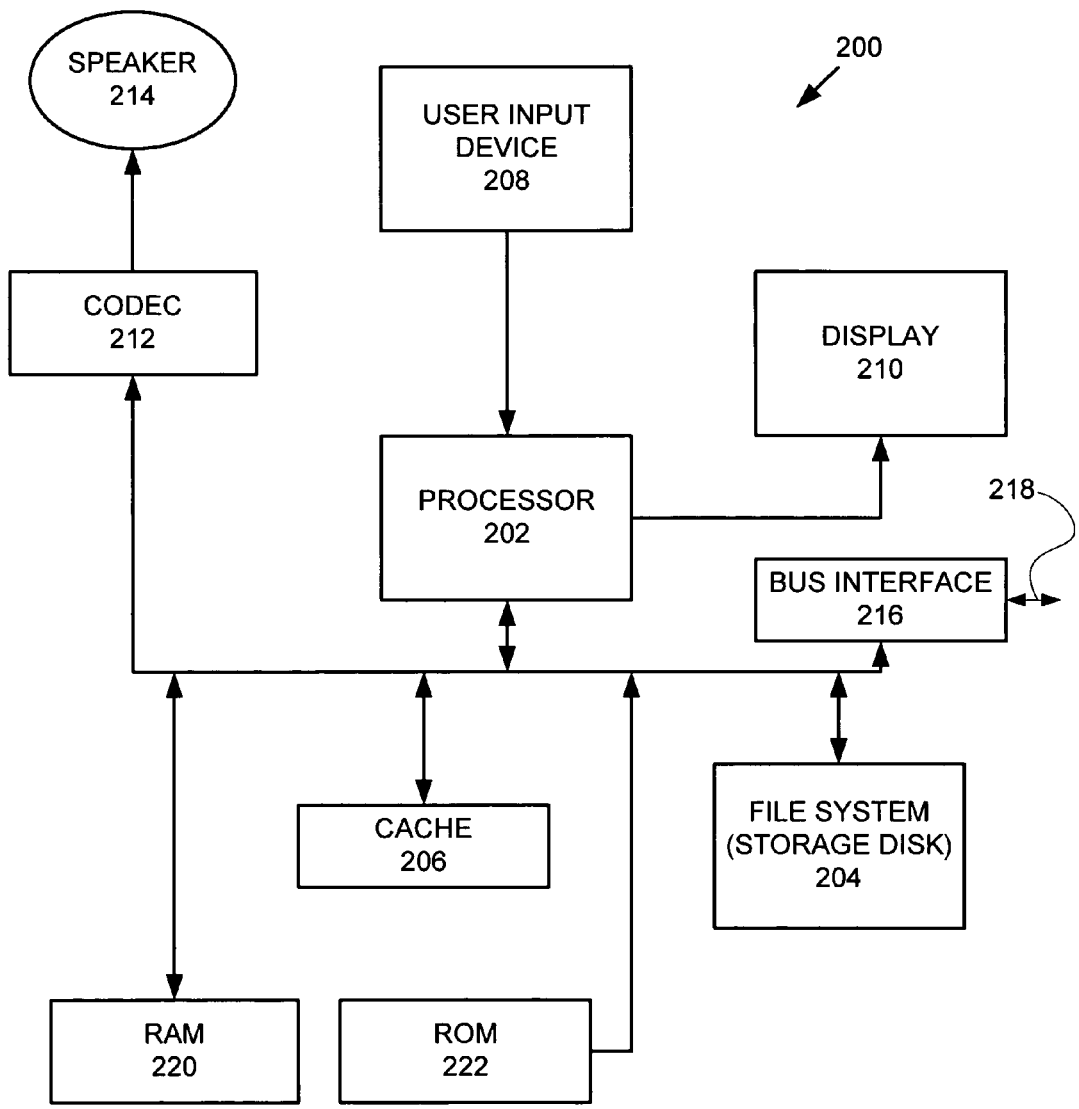
FIG. 2 shows an exemplary portable multimedia device, or media player, in accordance with an embodiment of the invention.

Particularly with music, the increased popularity of storing multimedia data (in the form of digital audio files having various formats such as MP3, AAC and AIFF) on a personal computer has resulted in a variety of products and services. For example, media player s (e.g., MP3 player), such as the iPod® multimedia device, can be used to store selected digital audio files which are then arranged in any manner deemed appropriate by a user. Accordingly, for the remainder of this discussion, the media player 102 will take the form of a music player along the lines of the iPod® multimedia device manufactured by Apple Computer Inc. of Cupertino, Calif. arranged to store any number of digital audio files in a memory device incorporated therein. FIG. 2 shows a portable media player 200 according to one embodiment of the invention. The media player 200 is, for example, suitable for use as the battery powered portable media player 102 shown in FIGS. 1A and 1B. The media player 200 includes a processor 202 that pertains to a microprocessor or controller for controlling the overall operation of the media player 200. The media player 200 stores media data pertaining to media assets in a file system 204 and a cache 206. The file system 204 is, typically, a storage disk or a plurality of disks. The file system 204 typically provides high capacity storage capability for the media player 200. However, since the access time to the file system 204 is relatively slow, the media player 200 can also include a cache 206. The cache 206 is, for example, Random-Access Memory (RAM) provided by semiconductor memory. The relative access time to the cache 206 is substantially shorter than for the file system 204. However, the cache 206 does not have the large storage capacity of the file system 204. Further, the file system 204, when active, consumes more power than does the cache 206. The power consumption is particularly important when the media player 200 is a portable media player that is powered by a battery (not shown). The media player 200 also includes a RAM 220 and a Read-Only Memory (ROM) 222. The ROM 222 can store programs, utilities or processes to be executed in a non-volatile manner. The RAM 220 provides volatile data storage, such as for the cache 206.

The media player 200 also includes a user input device 208 that allows a user of the media player 200 to interact with the media player 200. For example, the user input device 208 can take a variety of forms, such as a button, keypad, dial, etc. Still further, the media player 200 includes a display 210 (screen display) that can be controlled by the processor 202 to display information to the user. A data bus 224 can facilitate data transfer between at least the file system 204, the cache 206, and the processor 202. The media player 200 also includes a bus interface 216 that couples to a data link 218. The data link 218 allows the media player 200 to couple to a host computer over a wired connection.

In one embodiment, the media player 200 serves to store a plurality of media assets (e.g., songs) in the file system 204. When a user desires to have the media player 200 play a particular media item, a list of available media assets is displayed on the display 210. Then, using the user input device 208, a user can select one of the available media assets. The processor 202, upon receiving a selection of a particular media item, supplies the media data (e.g., audio file) for the particular media item to a coder/decoder (CODEC) 212. The CODEC 212 then produces analog output signals for a speaker 214. The speaker 214 can be a speaker internal to the media player 200 or external to the media player 200. For example, headphones or earphones that connect to the media player 200 would be considered an external speaker.

For example, in a particular embodiment, the available media assets are arranged in a hierarchical manner based upon a selected number and type of groupings appropriate to the available media assets. For example, in the case where the media player 200 is an MP3 type media player, the available media assets take the form of MP3 files (each of which corresponds to a digitally encoded song or other audio rendition) stored at least in part in the file system 204. The available media assets (or in this case, songs) can be grouped in any manner deemed appropriate. In one arrangement, the songs can be arranged hierarchically as a list of music genres at a first level, a list of artists associated with each genre at a second level, a list of albums for each artist listed in the second level at a third level, while at a fourth level a list of songs for each album listed in the third level, and so on.

The media player 200 also includes a wireless network interface 226 arranged to wirelessly transmit any selected data from the media player 200 to any appropriately configured receiver unit (e.g., the wireless network interface 114) over a wireless network. In the embodiment shown in FIG. 1, the wireless network interface 226 that takes the form of, for example, a "WiFi" interface according to the IEEE 802.11b or 802.11g standards. Other wireless network standards could also be used, either in alternative to the identified standards or in addition to the identified standards. Such other network standards could include the IEEE 802.11a standard or the Bluetooth standard.

In one embodiment, the media player 200 is a portable computing device dedicated to processing media such as audio. For example, the media player 200 can be a media player (e.g., MP3 player), a game player, a remote controller, a portable communication device, and the like. These devices are generally battery-operated and highly portable so as to allow a user to listen to music, play games or video, record video or take pictures, communicate with others, and/or control other devices. In one implementation, the media player 200 is a handheld device that is sized for placement into a pocket or hand of the user. By being handheld, the media player 200 is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the device may be operated by the user's hands, no reference surface such as a desktop is needed.

Referring back to FIG. 1A, during operation, a user has the option of selecting a number of operating modes for the system 100. In a first mode, a user selects desired music files stored in the media player 102 which are then decoded by the media player 102. The decoded music files are then passed by way of the cable 108 to the accessory unit 110 for further processing that includes amplification prior to being output to the output device 112. Since the cable 108 is bi-directional in nature, the amplification can be controlled by user supplied inputs to the user interface 106 or, by user supplied inputs to the user interface 113. In this way, the system 100 provides for output control by either the media player 102 or the accessory unit 110. It is also possible to forego the use of the audio device 112 in favor of an audio output device coupled to the port 122 but still maintain the option of providing user supplied input signals by way of the user interface 106 or 113. Again this arrangement is made possible by the bi-directional cable 108.

In a second (or radio) mode, a user can choose to listen to a radio station that is broadcast over the air (OTA) using an external antenna incorporated into the output device 112, for example, in conjunction with the accessory unit 110. In the described embodiment, the selection of a particular radio format (AM, FM, RDS/RBDS) can be effectuated by using either of the user interfaces 106 or 113 in tandem or separately. For example, the accessory unit 110 can be used as a standalone radio or the accessory unit 110 can be used as an adjunct to the media player 102 since the bi-directional cable 108 affords communication between media player 102 and the accessory unit 110. When selected as an RDS type radio (i.e., smart radio) a data channel incorporated into the cable 108 provides a conduit for data to be streamed from the accessory unit 110 to the media player 102. Such data (as described above) can be displayed as text on the display 104.

When operating in the radio mode, the system 100 provides the user with the capability of listening to any number of radio broadcast formats (both digital and analog) such as AM, FM, RDS/RBDS. In the case or RDS/RBDS, the accessory unit 110 provides data back to the media player 102 for display on the display 104. Such data includes metadata corresponding to a particular music selection currently being played such as artist name, title, time of day, location, station ID, etc. In some cases, other information can also be displayed that although not relevant to the current music selection would be of interest to the user. Such information includes current traffic conditions, weather alerts, stock quotes, etc. all of which is made available over a data channel. It should be noted, that any data can be stored in the media player 102 for later retrieval and display.

Figure 3A:
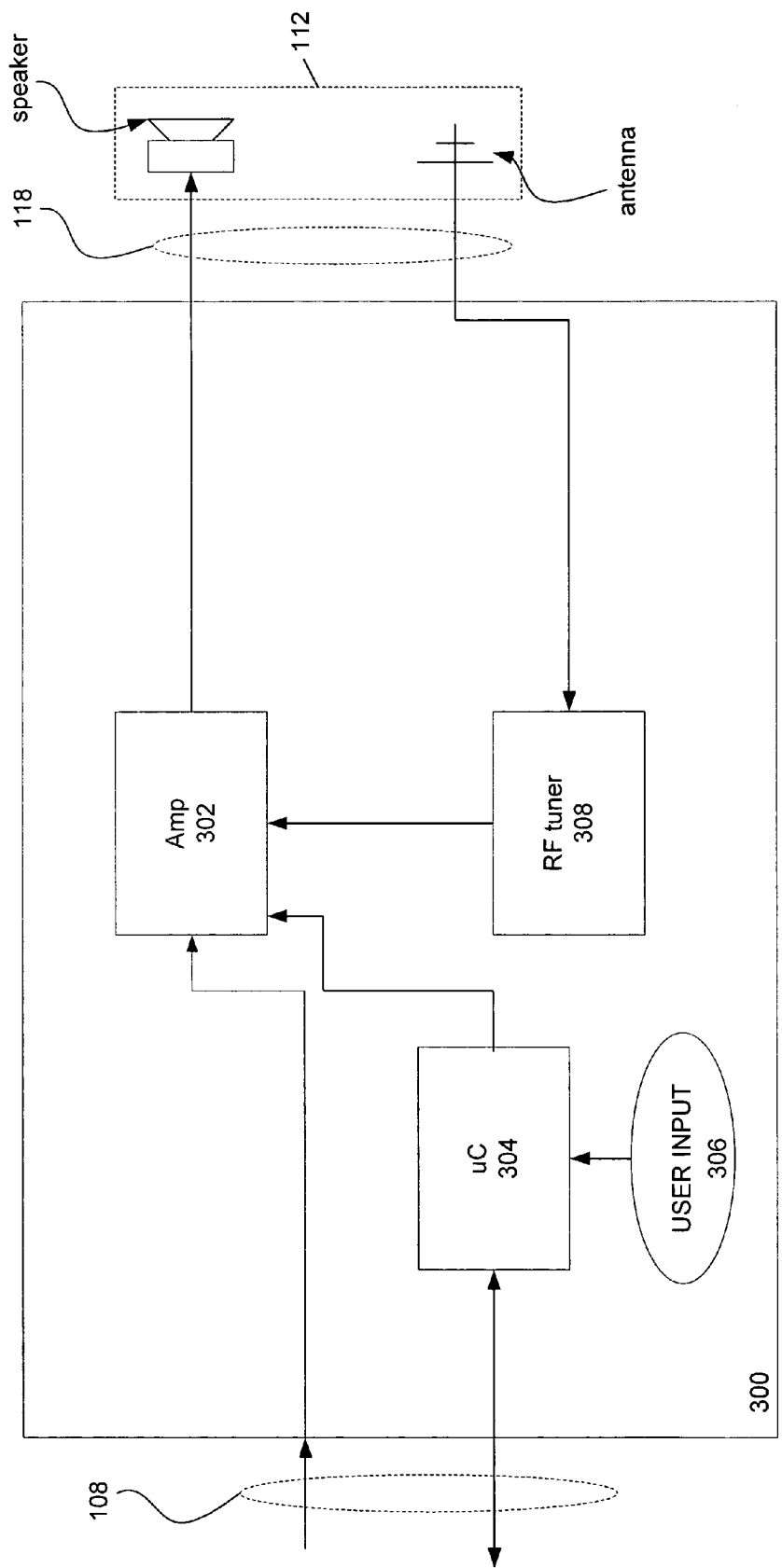
FIGS. 3A and 3B show examples of the media player of FIG. 2.
Figure 3B:
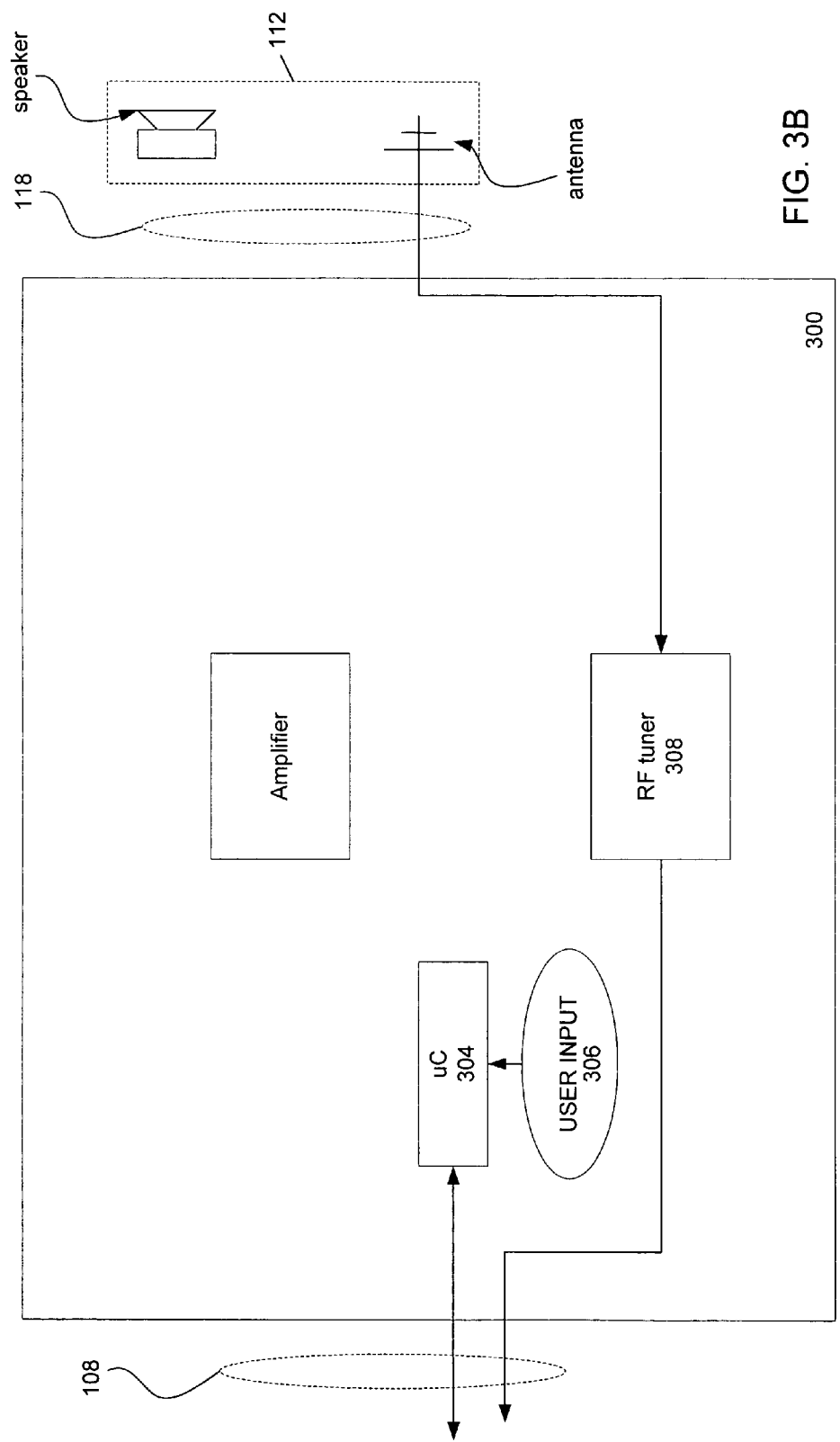

FIG. 3A shows an embodiment of a media player 300 as a particular implementation of the media player 110 having an amplifier unit 302 coupled to a microcontroller unit 304 arranged to provide appropriate control signals based, in part, upon input signals provided by a user input 306. An RF tuner 308 receives an RF signal via the connector 118 by way of an external antenna. In the described embodiment, the format of the RF signal as well as the particular frequency (i.e., station) can be selected by a user by way of either the user input 306 or by the PUI 106 in conjunction with the GUI 107 displayed on the display 104 in the media player 102. In those cases where the user takes advantage of the media player 102 to select a particular radio format and/or station, the control signals are passed by way of the cable 108 to the RF tuner 208. In some cases, however, it may be desirable to use the user input 306 to select the radio format an/or station and the user interface 106 to provide other control signals, such as volume. In that case, some of the control signals are passed from the media player 102 over the cable 108 whereas other control signals are provided by the microcontroller unit 304 to the RF tuner 308, or the amplifier unit 302, or any other component as needed. In any case, the output of the RF tuner 308 is provided to the amplifier unit 302 that, in turn, outputs an audio signal to the output device 112. FIG. 3B shows an embodiment of a media player 300 as a particular implementation of the media player 110 having whereby the audio signal from the RF tuner 308 is sent not to the amplifier unit 302 (as shown in FIG. 3A), but is sent back to the media player unit 102 by way of the cable 108. The media player 102, in turn, can provide (or not) any number or type of audio processing (i.e., attenuate the audio signal, amplify the audio signal, store the audio signal, record the audio signal to a storage medium such as a disk, time shift the audio signal, etc.) prior to the processed signal being returned to the accessory unit 108.

Figure 4:
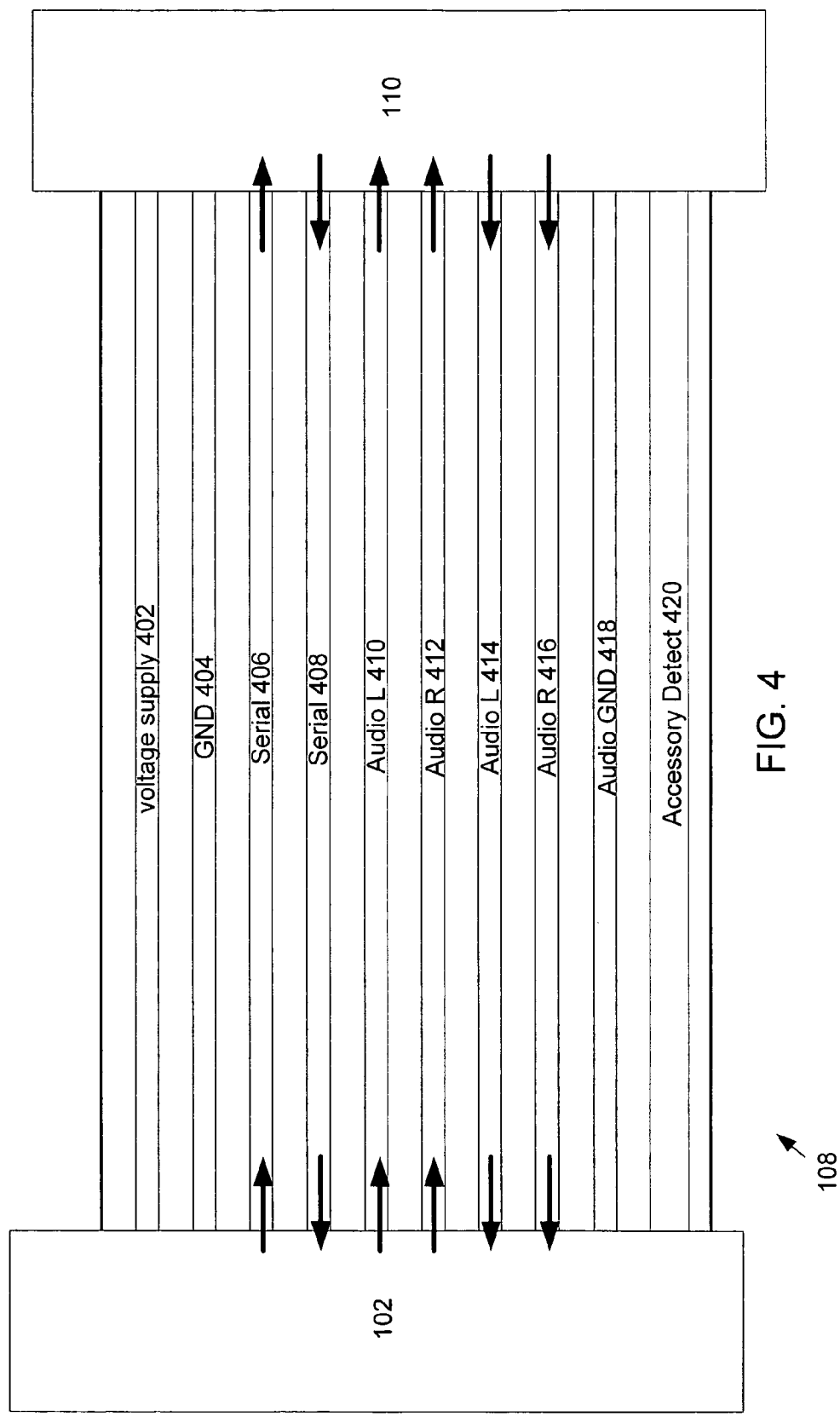
FIG. 4 shows a particular implementation of the bi-directional cable in accordance with an embodiment of the invention.

FIG. 4 shows a particular implementation of the bi-directional cable 108 in accordance with an embodiment of the invention. The bi-directional cable 108 includes a voltage supply line 402 arranged to provide an operating voltage (5 v or 3.3 v, for example) between the accessory unit 110 and the media player 102. In some cases, the operating voltage can be obtained from a battery incorporated in the media player or by an external power supply by way of a power port included in the media player 102. As shown, the cable 108 also includes a system ground line 404 and a pair of serial data lines 406 and 408 that, taken together, form a bi-directional datapath between the media player 102 and the accessory unit 110. It should be noted, however, that the data lines 406 and 408 are separate and distinct from each other and as such can be used independently to provide one way data path to/from the media player 102 and the accessory unit 110.

The cable 108 also includes a pair of audio lines 410 and 412 arranged in this embodiment as a left (L) and right (R) audio channel, respectively, for providing a left channel and a right channel audio data from the media player 102 to the accessory unit 110. Additional audio lines 414 and 416 provide a complementary audio data path from the accessory unit 110 to the media player 102. An audio ground line 418 is also provided. Furthermore, in a particularly useful implementation, the cable 108 includes an accessory detect line 402 that enables the accessory unit 110 to awaken, or otherwise power up from a sleep (inactive) state also referred to as a hibernation mode, the media player 102 even though the accessory unit 108 is ultimately powered by the media player 102. In the described embodiment, in the hibernation mode, the media player 102 draws any needed power from the accessory unit 108 and a user supplied button push on the accessory unit 108 has the effect of waking up the hibernating media player 102 resulting, in turn, with power again being supplied to the accessory unit 108 from the media player 102.

Figure 5:
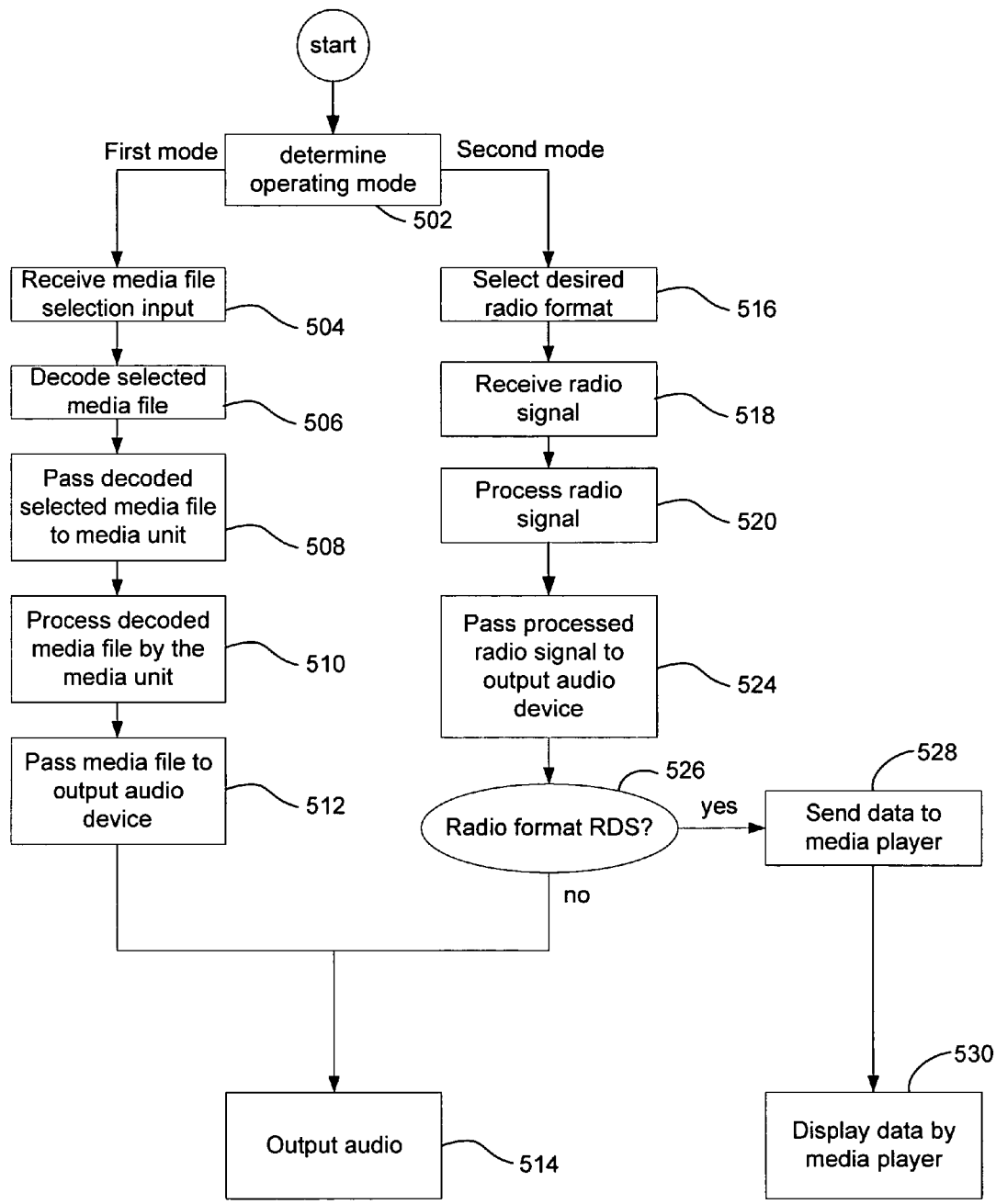
FIG. 5 shows a flowchart detailing a process in accordance with an embodiment of the invention.

FIG. 5 shows a flowchart detailing a process 500 in accordance with an embodiment of the invention. The process 500 begins at 502 by determining the particular operating mode of the communication system. When the communication system is operating in the first mode, then at 504 the media player receives a media file selection input that indicates which of the media files stored therein has been selected for play. As mentioned above, the selection process typically involves a user interface that includes physical keys, buttons, sliders, etc in conjunction with some form of a graphical user interface. Once selected, the media file is decoded by the media player at 506 that is then passed by way of the bi-directional cable to the accessory unit at 508. It should be noted that at any point in the process 500, various control signals can be used to vary any number of operational and/or play parameters such as volume, treble, bass, equalizer, etc. provided by the user interface at the media player or the media interface at the accessory unit.

Once the decoded media file has been passed to the accessory unit, the accessory unit processes the decoded media file at 510 and at 512, passes the processed media file to the output audio device. The output audio device then outputs the processed media file at 514.

Returning to 502, if it had been determined that the system has been configured to operate in the second (or radio) mode, then at 516, a desired radio format is selected using any of the available user interfaces on the media player or the accessory unit. Radio formats include, but are not limited to, (digital or analog) AM, FM, and RDS/RBDS. Once the desired radio format has been selected, the radio signal is captured by an antenna (which in some cases is incorporated into the output audio device) at 518 and processed by an RF tuner at 520. At this point, if the selected radio format is RDS (or RBDS), at 522, then at 524, any data encoded in the RDS signal is sent to the media player and for display at 526. In any format, however, the processed radio signal is passed to the output audio device at 528 that outputs the relevant audio content at 512.

Although the media items of emphasis in several of the above embodiments where audio items (e.g., audio files or songs), the media items are not limited to audio items. For example, the media item can alternatively, pertain to recorded discussions and the like.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A modular communication system operable in a number of operating modes, comprising:

a media player arranged to process a selected one of a plurality of digital media files stored therein; and an accessory unit connected to the media player by a bi-directional cable or by a wireless connection wherein when the media player is active and connected to the accessory by way of the bi-directional cable, the media player provides power to the accessory unit by way of the bi-directional cable and wherein the accessory unit provides power to the media player, when needed, the accessory unit comprising:

an RF unit arranged to receive and process an over the air (OTA) RF signal, an audio output device, and an amplifier unit connected to the RF unit and the audio output device arranged to amplify the processed RF signal, wherein in one operating mode the RF unit bypasses the amplifier unit and provides the processed RF signal directly to the media player for further processing, if any, by the media player.

2. The modular communication system as recited in claim 1, wherein the media player comprises:

a media player display;

a media player user interface comprising:

a graphical user interface displayed on the display, wherein a user selection of media files stored therein is assisted by the graphical user interface.

3. The modular communication system as recited in claim 1, wherein the further processing by the media player comprises amplifying the processed RF signal received directly from the accessory unit.

4. The modular communication system as recited in claim 2, wherein the further processing by the media player comprises:

when the processed RF signal includes an encoded data portion, decoding the encoded data portion; and displaying any displayable decoded data by the media player on the media player display.

5. The modular communication system as recited in claim 1, wherein in another operating mode, media files processed by the media player are passed directly to the accessory unit for further processing, if any, by the accessory unit.

6. The modular communication system as recited in claim 5, wherein the further processing by the accessory unit comprises amplifying the processed media file received from the media player by the amplifier unit.

7. The modular communication system as recited in claim 6, wherein the amplification of the processed media file by the accessory unit is controlled by the media player, wherein the control by the media player is initiated by a user provided input event at the media player user interface.

8. The modular communication system as recited in claim 1, wherein the media player further comprises a media player wireless interface and wherein the accessory unit further comprises an accessory unit wireless interface by way of which the media player and the accessory device wirelessly communicate with each other.

9. The wireless modular communication system as recited in claim 8, wherein the media player and the accessory taken together form a wireless network, wherein the media player can wirelessly control the accessory and the accessory can wirelessly control the media player at the discretion of the user.

10. A method performed by a modular communication system operable in a number of operating modes, the system including a media player arranged to process a selected one of a plurality of digital media files stored therein and an accessory unit connected to the media player by a bi-directional cable or by a wireless connection the accessory unit comprising an RF unit arranged to receive and process an over the air (OTA) RF signal, an audio output device, and an amplifier unit connected to the RF unit and the audio output device arranged to amplify the processed RF signal, the method comprising:

wherein in one operating mode, bypassing the amplifier unit by the RF unit; and providing the processed RF signal directly to the media player for further processing, if any, by the media player.

11. The method as recited in claim 10, wherein the media player comprises:

a media player display;

a media player user interface comprising:

a graphical user interface displayed on the display, wherein a user selection of media files stored therein is assisted by the graphical user interface.

12. The method as recited in claim 10, wherein the further processing by the media player comprises amplifying the processed RF signal received directly from the accessory unit.

13. The method as recited in claim 11, wherein the further processing by the media player comprises:

when the processed RF signal includes an encoded data portion, decoding the encoded data portion; and displaying any displayable decoded data by the media player on the media player display.

14. The method as recited in claim 10, wherein in another operating mode, media files processed by the media player are passed directly to the accessory unit for further processing, if any, by the accessory unit.

15. An accessory unit, comprising:

an RF unit arranged to receive and process an over the air (OTA) RF signal;

an audio output device; and an amplifier unit connected to the RF unit and the audio output device arranged to amplify the processed RF signal, wherein when the accessory unit is connected to a media player arranged to store media files, in one operating mode the RF unit bypasses the amplifier unit and provides the processed RF signal directly to the media player for further processing, wherein when the accessory unit is connected to the media player by a bi-directional cable and the media player is active, the media player provides power to the accessory unit by way of the bi-directional cable.

16. The accessory unit as recited in claim 15, wherein the media player is connected to accessory unit by the bi-directional cable or by a wireless connection.

17. The accessory unit as recited in claim 16, when the media player is active and connected to the accessory by way of the bi-directional cable, the media player provides power to the accessory unit by way of the bi-directional cable and wherein, when needed, the accessory unit provides power to the media player.

18. The accessory unit as recited in claim 15, wherein the accessory unit is operable in a stand alone mode.

19. The accessory unit as recited in claim 15, wherein the accessory unit further comprises:
   an accessory unit user interface arranged to receive a user supplied accessory unit input event; and
   a microcontroller unit arranged to receive the user supplied accessory unit input event and, in response, provide corresponding instruction signals to the amplifier unit and the RF unit.

20. The accessory unit as recited in claim 15, wherein the media player comprises:
   a display; and
   a media player user interface, wherein the media player user interface further comprises a graphical user interface displayed on the display for aiding a user in the selection of media files stored in the media player and for providing media player control signals.

21. The accessory unit as recited in claim 20, wherein the bi-directional cable includes an accessory detection line arranged to carry a detection signal used to detect if the media player is connected to the accessory unit.

22. The accessory unit as recited in claim 15, wherein when the accessory unit is connected to the media player and when the media player is hibernating, the media player is drawing power from the accessory unit.

23. The accessory unit as recited in claim 22, wherein when a user supplied wake up signal is provided by the accessory unit to the hibernating media player by way of the bi-directional cable, the media player wakes up and provides all necessary power to the accessory unit.

24. The accessory unit as recited in claim 20, wherein when the processed over the air (OTA) RF signal includes an encoded data signal, then the encoded data signal is passed to the media player for display of any displayable data.

25. A method performed by an accessory unit operable in a number of operating modes, wherein the accessory unit includes at least an RF unit arranged to receive and process an over the air (OTA) RF signal, an audio output device, and an amplifier unit connected to the RF unit and the audio output device arranged to amplify the processed RF signal, comprising:
   connecting the accessory unit to a media player by way of a bi-directional cable, wherein the media player is arranged to store media files and wherein when the media player is active, the media player provides power to the accessory unit by way of the bi-directional cable;
   receiving an OTA RF signal at the RF unit;
   processing the received OTA RF signal; and
   when the accessory unit is operating in a bypass mode, bypassing the amplifier unit and providing the processed RF signal directly to the media player arranged for further processing.

26. The method as recited in claim 25, wherein the another device is a portable media player connected to the accessory by the bi-directional cable or by a wireless connection.

27. The method as recited in claim 26 wherein when the media player is connected to the accessory by way of the bi-directional cable, the media player provides power to the accessory unit by way of the bi-directional cable and wherein, when needed, the accessory unit provides power to the media player.

28. The method as recited in claim 27, further comprising:
   controlling an operation of the accessory unit by a user using only the media player; and
   controlling an operation of the media player by the user using only the accessory unit.

29. The method as recited in claim 27, wherein when the media player is hibernating, then
   providing power to the hibernating media player by way of the bi-directional cable by the accessory unit.

30. The method as recited in claim 29, further comprising:
   providing a wake up signal by the accessory unit to the hibernating media player;
   waking up the hibernating media player in response to the wake up signal; and
   ceasing the supply of power by the accessory unit to the media player when the media player is awake and active.

* * * * *